(12) United States Patent
Webb et al.

(10) Patent No.: US 10,712,814 B2
(45) Date of Patent: Jul. 14, 2020

(54) MULTI-DEVICE VIRTUAL REALITY, AUGMENTED REALITY AND MIXED REALITY ANALYTICS

(71) Applicant: Accenture Global Solutions Limited, Dublin (IE)

(72) Inventors: Sunny Webb, San Francisco, CA (US); Matthew Thomas Short, San Jose, CA (US); Manish Mehta, Milpitas, CA (US); Robert Dooley, Dublin, CA (US); Grace T. Cheng, Sunnyvale, CA (US); Alpana Dubey, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/956,816

(22) Filed: Apr. 19, 2018

(65) Prior Publication Data
US 2018/0307311 A1    Oct. 25, 2018

Related U.S. Application Data

(60) Provisional application No. 62/488,457, filed on Apr. 21, 2017.

(51) Int. Cl.
| | | |
|---|---|---|
| *G06F 3/01* | (2006.01) | |
| *G06T 3/40* | (2006.01) | |
| *G06T 19/00* | (2011.01) | |

(52) U.S. Cl.
CPC .............. *G06F 3/013* (2013.01); *G06F 3/011* (2013.01); *G06F 3/012* (2013.01); *G06T 3/40* (2013.01); *G06T 19/006* (2013.01)

(58) Field of Classification Search
CPC ......... G06F 3/011; G06F 3/012; G06T 19/006
See application file for complete search history.

(56) References Cited

U.S. PATENT DOCUMENTS

| | | | |
|---|---|---|---|
| 2002/0021758 A1 | 2/2002 | Chui | |
| 2004/0104935 A1* | 6/2004 | Williamson | ............ G06F 3/012 715/757 |

(Continued)

FOREIGN PATENT DOCUMENTS

| | | |
|---|---|---|
| EP | 2919098 | 9/2015 |

OTHER PUBLICATIONS

Charles Singletary; "Exterminate Bugs in Your VR Gaming Design With SceneExplorer," Nov. 9, 2016, [retrieved on Apr. 10, 2018], Retrieved from URL: <https://uploadvr.com/game-bugs-sceneexplorer/>, 6 pages.

(Continued)

*Primary Examiner* — Kent W Chang
*Assistant Examiner* — Chayce R Bibbee
(74) *Attorney, Agent, or Firm* — Fish & Richardson P.C.

(57) ABSTRACT

Methods, systems, and apparatus for performing virtual reality simulations using virtual reality systems. In some aspects a method includes the actions of logging user actions in a virtual reality system, wherein the user actions include one or more of (i) a path traveled by user in the virtual reality system, or (ii) user interactions with objects in the virtual reality system; aggregating logged action over a first user and a second user; and deriving modifications to the virtual reality system based at least in part on the aggregated logged actions. The modifications to the VR system can include modifying at least one of (i) appearance of objects shown in the VR system, (ii) floor plan of the VR system, and (iii) location of objects shown in the VR system.

19 Claims, 10 Drawing Sheets

(56) References Cited

U.S. PATENT DOCUMENTS

| | | | |
|---|---|---|---|
| 2010/0050100 A1* | 2/2010 | Dettinger | G06F 3/011 715/764 |
| 2012/0089488 A1* | 4/2012 | Letchford | G06Q 30/02 705/27.2 |
| 2012/0293506 A1* | 11/2012 | Vertucci | G06F 3/012 345/419 |
| 2016/0049004 A1* | 2/2016 | Mullins | G06T 19/006 345/419 |
| 2018/0061116 A1* | 3/2018 | Mitchell | G06T 15/20 |

OTHER PUBLICATIONS

'cognitive3d.com' [online], "SceneExplorer," Jan. 11, 2017, [retrieved on Apr. 10, 2018], Retrieved from URL: < https://cognitive3d.com/product/scene-explorer/ >, 5 pages.

'cognitive3d.com' [online] "Analytics for Digital Realities," Available on or before May 11, 2013 via the Wayback Internet Archive [retrieved on Jul. 19, 2018] Retrieved from Internet: URL<https://cognitive3d.com/> 4 pages.

'www.tobii.com' [online] "Virtual Reality," Available on or before Jan. 20, 2016 via the Wayback Internet Archive [retrieved on Jul. 19, 2018] Retrieved from Internet: URL<https://www.tobii.com/tech/products/vr/> 5 pages.

'virtualrealitypop.com' [online] "Object Recognition in Augmented Reality," Anastasiia Bobeshko, Apr. 7, 2017, [retrieved on Jul. 19, 2018] Retrieved from Internet: URL<https://virtualrealitypop.com/object-recognition-in-augmented-reality-8f7f17127a7a> 8 pages.

'en.wikipedia.org' [online] "Vuforia Augmented Reality SDK," Last updated: Mar. 3, 2018, [retrieved on Jul. 19, 2018] Retrieved from Internet: URL<https://en.wikipedia.org/wiki/Vuforia_Augmented_Reality_SDK> 2 pages.

'www.wikitude.com' [online] "Wikitude Image Recognition," Copyright 2018, [retrieved on Jul. 19, 2018] Retrieved from Internet: URL<https://www.wikitude.com/augmented-reality-image-recognition/> 3 pages.

Zhang et al. "Design of mobile augmented reality game based on image recognition," Journal of Image Video Processing, Dec. 2017, 20 pages.

EP Search Report in European Appln. No. 18168568.6, dated Jul. 18, 2018, 7 pages.

EP Office Action is European Appln. No. 18168568.6, dated Jun. 14, 2019, 3 pages.

\* cited by examiner

*The Presenter walks around the switches that have exploded out of the panel*

"Amelia, can you give me more information on this switch"

*Box of information for the panel also appears. User can read out some information and then click close*

"Ok, this is a Square D Homeline breaker that is capable of handling 20 amps"

MULTI-DEVICE VIRTUAL REALITY, AUGMENTED REALITY AND MIXED REALITY ANALYTICS

CROSS-REFERENCE TO RELATED APPLICATIONS

This application claims the benefit under 35 U.S.C. § 119(e) of the filing date of U.S. Patent Application No. 62/488,457, for "Multi-Device Virtual Reality, Artificial Reality and Mixed Reality Analytics" which was filed on Apr. 21, 2017, and which is incorporated here by reference.

TECHNICAL FIELD

This specification relates to the fields of virtual reality, mixed reality, augmented reality, product engineering and manufacturing, and others discussed below.

BACKGROUND

Automotive, aerospace, ground transportation equipment and other industries use virtual reality technologies as part of product engineering and manufacturing engineering. For example, virtual reality technology can be used to enable engineers from different disciplines to view and test current product designs—sometimes prior to the availability of any physical prototypes. Within a virtual reality environment, products can be viewed from multiple angles and properties of products can be tested through computational or physical simulations.

SUMMARY

This specification describes systems and methods for applying immersive technology to a product development and manufacturing process. Innovative aspects of the subject matter described in this specification may be embodied in methods that include the actions of logging user actions in a virtual reality (VR) system, wherein the user actions comprise one or more of (i) a path traveled by user in the VR system, or (ii) user interactions with objects in the VR system; aggregating logged action over a first user and a second user; and deriving modifications to the VR system based at least in part on the aggregated logged actions. In some implementations modifications to the VR system include modifying one or more of (i) appearance of objects shown in the VR system, (ii) floor plan of the VR system, (iii) location of objects shown in the VR system Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations logging user actions in the VR system includes logging user actions using one or more sensors.

In some implementations the sensors include one or more of internet of things (TOT) sensors, VR sensors, mixed reality (MR) sensors.

In some implementations logging user interactions includes monitoring how a user looks at an object for example by monitoring a user's gaze direction.

In some implementations user interactions comprise touching an object in the VR system, for example by using at least one hand.

Modifying an appearance of objects shown in the VR system can include rendering objects with a low number of user interactions at a lower visual fidelity than objects with a high number of user interactions. Rendering objects with a low number of user interactions at a lower visual fidelity can include rendering objects at a lower resolution. Rendering objects with a low number of user interactions at a lower visual fidelity can include rendering objects in two dimensions. Modifying an appearance of objects shown in the VR system can include similarly rendering objects with a low number of user interactions. Deriving modifications to the VR system based at least in part on the aggregated logged actions can include applying crowd-guided assistance.

Another innovative aspect of the subject matter described in this specification can be embodied in a system including one or more computers and one or more storage devices on which are stored instructions that are operable, when executed by the one or more computers, to cause the one or more computers to perform operations. The operations include: logging user actions in a VR system, wherein the user actions comprise one or more of (i) a path traveled by user in the VR system, or (ii) user interactions with objects in the VR system; aggregating logged action over a first user and a second user; and deriving modifications to the VR system based at least in part on the aggregated logged actions, the modifications to the VR system comprising modifying one or more of (i) appearance of objects shown in the VR system, (ii) floor plan of the VR system, and (iii) location of objects shown in the VR system.

Modifying an appearance of objects shown in the VR system can include rendering objects with a low number of user interactions at a lower visual fidelity than objects with a high number of user interactions.

Rendering objects with a low number of user interactions at a lower visual fidelity can include rendering objects at a lower resolution.

Rendering objects with a low number of user interactions at a lower visual fidelity can include rendering objects in two dimensions.

Modifying an appearance of objects shown in the VR system can include similarly rendering objects with a low number of user interactions.

Logging user interactions can include monitoring how a user looking at an object, determined by angle and direction head is facing.

Monitoring how a user looks at an object can include monitoring a user's gaze direction.

User interactions can include touching an object in the VR system.

Deriving modifications to the VR system based at least in part on the aggregated logged actions can include applying crowd-guided assistance.

In some implementations deriving modifications to the VR system based at least in part on the aggregated logged actions includes applying crowd-guided assistance.

Another innovative aspect of the subject matter described in this specification may be embodied in a system including one or more computers and one or more storage devices on which are stored instructions that are operable, when executed by the one or more computers, to cause the one or more computers to perform operations including identifying, by a voice recognition system, a request from a user to view an object; processing, by an artificial intelligence model, the identified request; outputting, by a virtual reality system and based on an identified digital file, a 3D image of the object, wherein the user can interact with the 3D image receiving an input from the user indicating an area of interest associated with the 3D image; an outputting, by a virtual reality system, an enhanced interactive 3D image of at least a portion of the object based on the received input.

The foregoing and other embodiments can each optionally include one or more of the following features, alone or in combination. In some implementations the identified request from the user comprises one or more of (i) a verbal request to view an object, and (ii) a hand gesture indicating a request to view an object.

In some implementations the verbal request comprises a verbal command.

In some implementations the received input indicating an area of interest associated with the virtual 3D image comprises one or more of a (i) verbal input, or (ii) gesture input.

In some implementations the verbal input includes verbal instructions.

In some implementations the gesture input includes data indicating one or more of (i) a user gaze direction, (ii) a hand gesture.

In some implementations a user gaze direction is determined using an eye tracking subsystem included in the virtual reality system.

In some implementations the gesture input is determined using one or more body motion sensors.

In some implementations processing, by the artificial intelligence model, the identified request comprises determining a verbal response to the identified request.

In some implementations the operations performed by the system further includes outputting, by the visualization system, a virtual image of an artificial intelligence assistant.

In some implementations the request from the user to view the object includes a request directed to the artificial intelligence assistant.

In some implementations the user can interact with the 3D image through the artificial intelligence assistant.

In some implementations the 3D image is a hologram.

In some implementations outputting an enhanced interactive 3D image includes outputting a 3D simulation of a process that may be performed by the object.

Another innovative aspect of the subject matter described in this specification may be embodied in a system including one or more computers and one or more storage devices on which are stored instructions that are operable, when executed by the one or more computers, to cause the one or more computers to perform operations including receiving, at an artificial intelligence engine connected to a virtual reality display, data representing a request from a user to view an object; providing, via the virtual reality display, a 3D image of the object; receiving, at the artificial intelligence engine, input from the user representing a specified area of interest associated with the object; and providing, from the artificial intelligence engine, an enhanced interactive 3D image of at least a portion of the object.

The foregoing and other embodiments can each optionally include one or more of the following features, alone or in combination. In some implementations the request from the user comprises one or more of (i) a verbal request to view an object, and (ii) a hand gesture indicating a request to view an object.

In some implementations the verbal request comprises a verbal command.

In some implementations the received input representing an area of interest associated with the object comprises one or more of a (i) verbal input, or (ii) gesture input.

In some implementations the verbal input comprises verbal instructions.

In some implementations the gesture input comprises data indicating one or more of (i) a user gaze direction, (ii) a hand gesture.

In some implementations a user gaze direction is determined using an eye tracking subsystem included in the virtual reality system.

In some implementations the gesture input is determined using one or more body motion sensors.

In some implementations the system may be further configured to perform operations comprising providing, via the virtual reality display, a virtual image of an artificial intelligence assistant.

In some implementations the input from the user specifying an area of interest associated with the object comprises a request directed to the artificial intelligence assistant.

In some implementations the user can interact with the 3D image of the object through the artificial intelligence assistant.

In some implementations the 3D image comprises a hologram.

In some implementations providing, from the artificial intelligence engine, an enhanced interactive 3D image of at least a portion of the object comprises providing a 3D simulation of a process that may be performed by the object.

Another innovative aspect of the subject matter described in this specification may be embodied in methods that include the actions of obtaining a spatial map of a mixed reality (MR) environment; obtaining snapshots of a real world environment corresponding to the MR environment; identifying real world objects in the spatial map using the obtained snapshots of the real world environment; and adjusting the MR environment based on the identified real world objects.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations obtaining snapshots of the real world environment comprises dynamically obtaining snapshots at regular intervals of time.

In some implementations identifying real world objects in the spatial map comprises applying image recognition techniques to the obtained snapshots.

In some implementations identifying real world objects in the spatial map comprises: identifying multiple candidate real world objects in the real world environment; assigning a confidence score to each of the multiple candidate identified real world objects, each confidence score representing a likelihood that the candidate real world object has been correctly identified; selecting a predetermined number of highest scoring real world objects as the identified real world objects; and linking the identified real world objects to the spatial map.

In some implementations the real world environment comprises multiple real world objects, and the spatial map comprises digital information that overlays one or more of the real world objects.

In some implementations adjusting the MR environment based on the identified real world objects comprises: identifying whether incorrect digital information is overlaying one or more real world objects; and in response to identifying that incorrect digital information is overlaying one or more real world object, correcting the digital information.

In some implementations adjusting the MR environment is further based on MR viewer input.

In some implementations adjusting the MR environment based on the identified real world objects comprises applying crowd guided assistance.

The subject matter described in this specification can be implemented in particular embodiments so as to realize one or more of the following advantages. In some cases, a virtual reality analytics platform, as described in this specification, may be used to improve virtual reality environments. For example, user actions within a virtual reality environment may be logged and analyzed to determine modifications that can be made to improve the virtual reality environment and to improve the computational resources and costs associated with the virtual reality environment. For example, by identifying areas within a virtual reality environment that a user rarely interacts with, the virtual reality system can render objects in these areas at lower visual fidelity compared to objects in areas with which a user often interacts. In this manner, the virtual reality environment may provide a realistic user experience while reducing required computational costs and resources. As another example, image recognition techniques can be used to improve the accuracy of mixed reality environments. As a further example, digital files can be explored and features of a product can be investigated in a conversational manner within a virtual reality environment.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
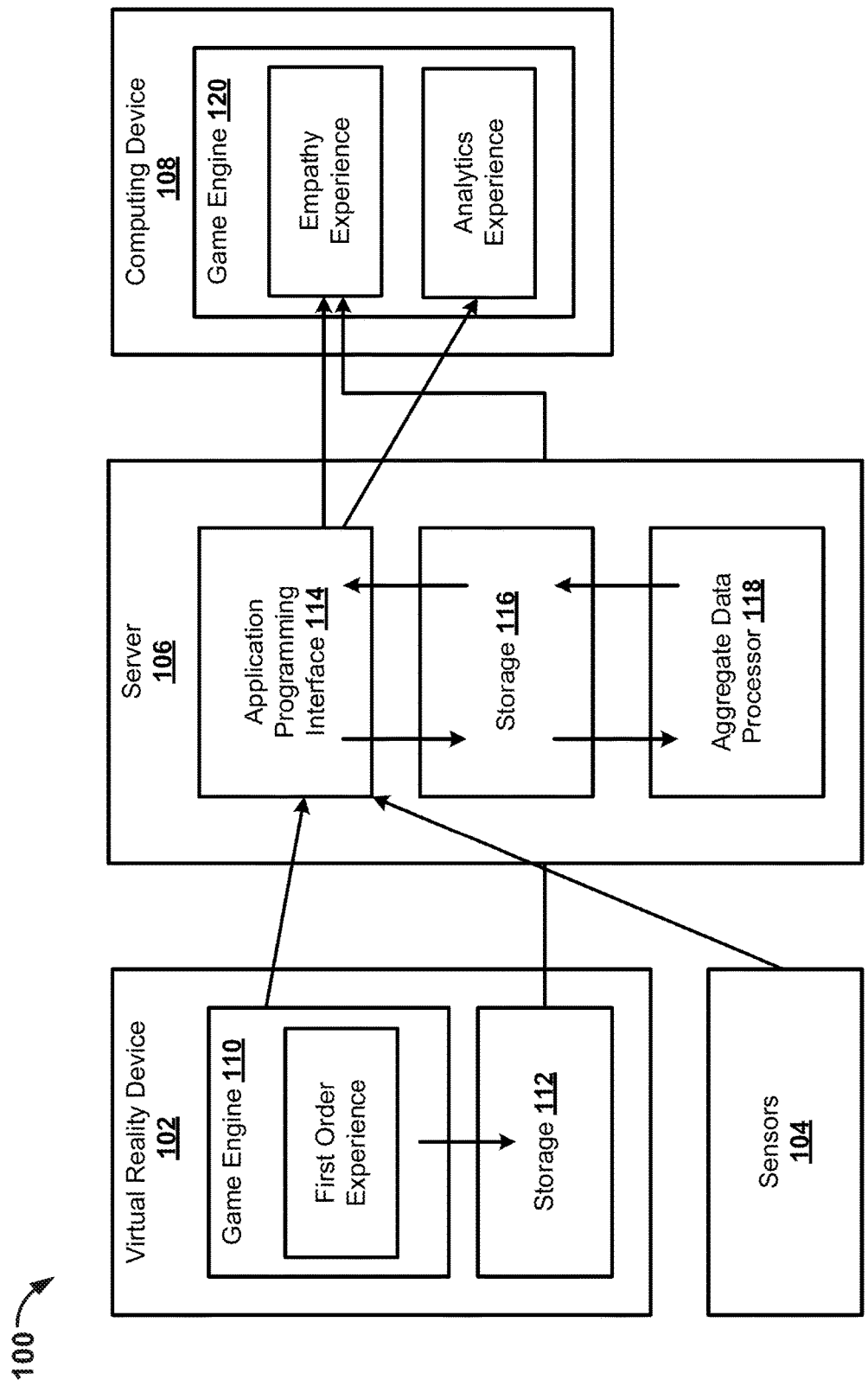
FIG. 1 shows a block diagram of an example virtual reality analytics platform.

This specification describes using immersive technology, e.g., virtual reality, mixed reality, and augmented reality, to assist in product development and manufacturing. In particular, immersive technology is used to analyze products and to provide an improved understanding of how people use products. In some implementations immersive technology may be further combined with crowd technology, e.g., a crowd assistance platform, to assist in product development.

A product development process may be described as including three stages, namely (i) crowd design, (ii) content conversion, and (iii) asset creation, internet of things (IoT) visualization and data processing. During a crowd design stage, a crowd of experts, e.g., engineers, may gather and verify product ideas. In particular, a crowd assistance platform may enable the crowd of experts to verify engineering, manufacturing and operations processes. For example, a designer or worker can submit a request, e.g., to verify, modify or optimize a product design, to the crowd assistance platform together with technical specifications, images, computer simulations and voice recordings. Experts can respond to the request in real time. The crowd assistance platform may improve the speed and efficiency of product design and development, since products can be developed and tested quicker than traditional, internal design and verification processes.

Often, product designs are created, modified, analyzed and/or optimized using computer aided design (CAD) software installed on a computing system. For example, engineers typically design products, e.g., cars or planes, using CAD software. CAD software enables product engineers to improve the quality of a design of a product, document the design process of a product, and create a database for manufacturing the product. However, typically CAD outputs take the form of electronic files with a specific format, e.g., a format suitable for printing or machining. In some cases this specific format is not compatible with immersive technology computer systems, e.g., that rely on polygonal models as opposed to parametric/mathematical models. During a content conversion stage of a product development process, files created using computer-aided design (CAD) software are converted to an alternative format that can be visualized or rendered using virtual reality (VR) or mixed reality (MR) software.

During an asset creation, IOT visualization and data processing stage, a physical product may be created and set up with IOT sensors. Data can be taken from the sensors and digitalized on product designs/models that have be created using a CAD conversion process or other file conversion techniques. The digitalized data can be visualized and analyzed using immersive technology, e.g., mixed reality, virtual reality, or augmented reality (AR), to provide further insights and information to assist in the produce development process.

An example innovative aspect described in this specification includes tracking data representing a user's actions as they experience a VR system. Analytics are performed on the tracked data with the goal to understand the user's experience. Based on the performed analytics, modifications to the VR system may be determined and implemented. For example, the appearance, layout or order of the VR system may be modified.

A further example innovative aspect described in this specification includes combining image recognition with a MR or AR device to improve the intelligence of the MR device. For example, image recognition techniques can be used to identify objects within a real world environment. The MR or AR device can take photos of the real world environment, e.g., at regular intervals such as every three seconds, and provide the photos to an image recognition component/device. The image recognition device can recognize objects in the photos and provides the MR or AR device with data identifying the objects. Based on the received data, the MR or AR device can alter the display shown to a user wearing the MR or AR device.

A further innovative aspect described in this specification enables digital files to be explored using AI. Existing technologies, such as voice recognition and AI technology, can be combined in a new method and system for interacting with products under development. A user of the technology can conversationally explore and investigate features of a product in real-time.

FIG. 1 shows a block diagram of an example virtual reality analytics platform 100. The virtual reality analytics platform 100 is an example of a system implemented as computer programs on one or more computing devices in one or more locations, in which the systems, components, and techniques described below can be implemented.

The virtual reality analytics platform 100 is configured to support augmented reality (AR), virtual reality (VR), and mixed reality (MR) devices for individual and remote user collaboration. Activities supported include crowd-guided assistance and inspection, artificial intelligence guided assistance, and parallel interaction across user locations.

The virtual reality analytics platform 100 includes a virtual reality device 102, one or more sensors 104, a server 106, and a computing device 108. Each of the components included in the virtual reality analytics platform 100 may be in data communication with each other, e.g., through a communication network such as a local area network or wide area network.

The virtual reality device 102 includes a game engine 110 and a storage module 112. In some implementations the virtual reality device 102 may include a VR headset or other wearable device. Data representing a user VR experience whilst wearing or otherwise using the virtual reality device 102, e.g., data representing a first order VR experience, may be written to the storage module 112.

The one or more sensors 104 may include but are not limited to pressure sensors, motion sensors, temperature sensors, light sensors, force sensing resistors, tactile sensors, flow measurement devices, chemical sensors, or altitude sensors. In some implementations the sensors may be IoT sensors. The one or more sensors 104 may be embedded in or positioned on a real world object or within a real world environment and used to collect sensor data. For example, the one or more sensors 104 may be positioned on a real world object that is to undergo a physical simulation. During the physical simulation, the sensors may collect dynamic sensor data representing detected changes or properties of the real world object during the physical simulation. As another example, the one or more sensors 104 may be positioned within a real world environment corresponding to a virtual reality environment. During a virtual reality or simulation in the virtual reality environment, sensors positioned in the corresponding real world environment may be used to track and log user actions, or to identify voice commands or gestures performed by the user.

The server 106 includes an application programming interface 114, storage module 116 and an aggregate data processor 118. The server is configured to receive data inputs from the virtual reality device 102 and from one or more sensors 104. Received data inputs may be processed by the components included in the server 106 to generate data outputs that are provided to the computing device 108.

The computing device 108 further includes a game engine 120. The game engine can include an empathy experience module and an analytics experience module. The empathy experience module can simulate an experience that is constrained by rules, for example where the game player is less empowered, and that therefore lead to empathy. Examples of empathy-based games include games that simulate riots that have actually happened or games where the game player is a young boy who is bullied. The analytics experience module provides an analytics on the game player's experience. The application programming interface 114 can provide inputs to the empathy experience module and/or the analytics experience module.

In some implementations the system 100 may include a crowd assistance platform. The crowd assistance platform may provide crowd guided assistance to a product manufacturing process. Remote workers can use the crowd assistance platform to verify engineering, manufacturing and operations processes by interfacing with distributed crowd experts. The workers can share requests, technical specifications, images and voice requests to the crowd assistance platform, and crowd experts can respond in real time.

Figure 2:
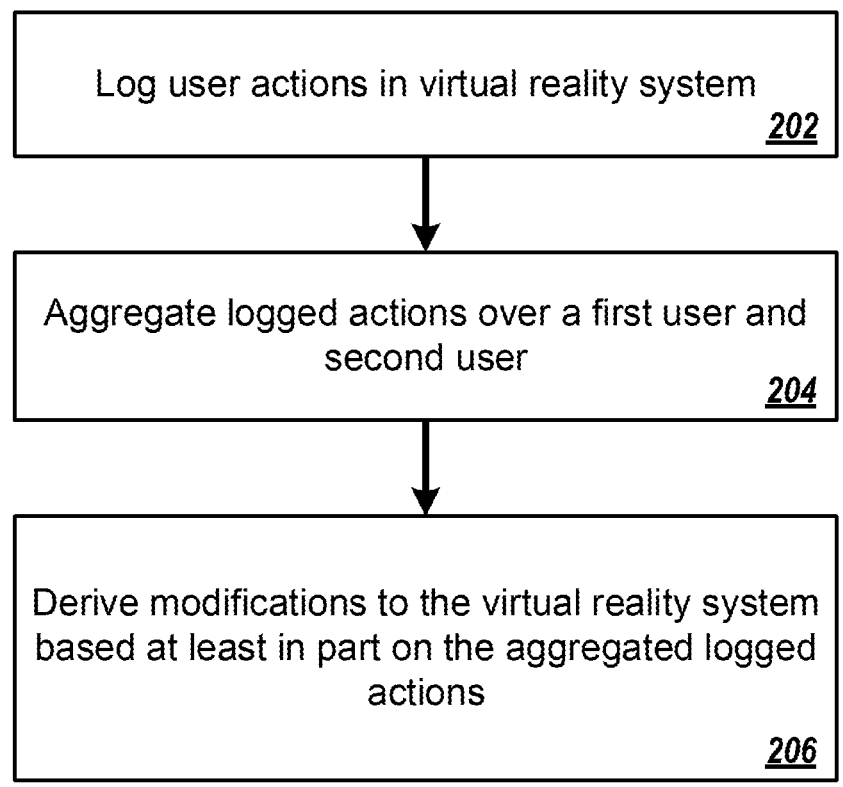
FIG. 2 is a flowchart of an example process for deriving modifications to a virtual reality system.

FIG. 2 is a flowchart of an example process for of an example process for deriving modifications to a virtual reality system. For convenience, the process 200 will be described as being performed by a system including one or more computers located in one or more locations. For example, an analytics platform, e.g., the virtual reality analytics platform 100 of FIG. 1, appropriately programmed, can perform the process 200.

The system logs user actions in a virtual reality (VR) system (step 202). For example, a user may be wearing a VR headset or other device that immerses the user into a VR environment. As the user explores the VR environment, the system may track or log their actions. User actions may include one or more of (i) a path traveled by user in the VR environment, or (ii) user interactions with objects in the VR system. As an example, a user may be immersed into a VR environment representing a store. As the user explores the store, e.g., walking up and down various aisles, the system may track the path they travel and objects they interact with. An example of logged user actions in a VR system is discussed below with reference to FIG. 3.

The system may log the user actions using one or more sensors positioned within a real world environment corresponding to the VR environment and/or one or more sensors positioned on the user or VR headset. The sensors can include IoT sensors, VR sensors, or mixed reality (MR) sensors. For example, one or more sensors may be configured to monitor a user's gaze direction, or determine an angle and direction in which a user's head is facing. Data received from such sensors may be used to determine whether a user is looking at an object within the VR environment. As another example, one or more sensors may be configured to determine hand location and motion. Data received from such sensors may be used to determine whether a user is touching a VR object in the VR environment, e.g., picking up a virtual product from a virtual shelf within a virtual store.

The system aggregates logged actions over a first user and a second user (step 204). For example, step 202 described above may be repeated for multiple users in the VR system. The system may then aggregate logged actions over each of the multiple users.

The system derives modifications to the VR system based at least in part on the aggregated logged actions (step 206). In some implementations, modifications to the VR system may include modifying one or more of (i) an appearance of objects shown in the VR system, (ii) a floor plan of the VR system, or (iii) locations of objects shown in the VR system. For example, the system may analyze one or more logged user actions and determine that no user visited a certain area of the VR environment, or that no user interacted with a particular object within the VR environment. Based on this information, modifications to the VR environment may be determined. For example, the layout of the VR environment may be changed in order to encourage users to visit a certain area of the VR environment. As another example, the appearance of objects within the VR environment may be modified, e.g., to make the objects appear more realistic, to encourage users to interact with the object.

In some cases, the system derives modifications that improve the computational efficiency of the VR system. For example, in some cases modifying an appearance of objects shown in the VR system may include analyzing one or more logged user actions to identify areas of the VR system or objects in the VR system with which users rarely interact. In response thereto, the system may modify those areas or objects by rendering the areas or objects at a lower visual fidelity compared to areas or with which users often interact. For example, the system may render areas or objects with which users rarely interact at a lower resolution compared to other areas or objects, or render the objects in only two dimensions instead of three dimensions. In some implementations the system may scale the rendering visual fidelity with the logged user interactions, i.e., apply increasing visual fidelity for objects with increasing numbers of user interactions. Such modifications can reduce the computational cost of the VR environment while maintaining the quality of a user's experience.

As another example, modifying an appearance of objects shown in the VR system may include analyzing one or more logged user actions to identify areas of the VR system or objects in the VR system with which users rarely interact. In response thereto, the system may modify those areas or objects by rendering the areas or objects in a similar way. For example, if the system identifies a particular area of the VR environment with which users rarely interacted, the system may populate the area with identically rendered objects. Again, such modifications can reduce the computational cost of the VR environment while maintaining the quality of a user's experience.

In some implementations the system may derive modifications to the VR system using crowd guided assistance. For example, the system may be configured to share requests, technical specifications, or images relating the VR system with crowd experts using a crowd assistance platform. The crowd experts may respond to received requests in real time.

The above described method may be applied in various settings. In some implementations, the system may use logged user actions as part of an employee training process. Once a user is wearing a VR device, e.g., headset, the user has control over what they see and actions they take. By using the VR system and method described above to train an employee on a new task it may be accurately determined whether the employee has viewed certain training material.

Their compliance may therefore be confirmed. In addition, by logging the employee's actions it may be determined whether or not the designed VR environment was effective or not, e.g., whether the designed VR environment exposed the employee to enough situations or information. If it is determined that the VR environment was not effective, e.g., if the employee did not learn or master a new task successfully, modifications to the design of the VR environment to make the VR environment more conducive may be considered and implemented.

Figure 3:
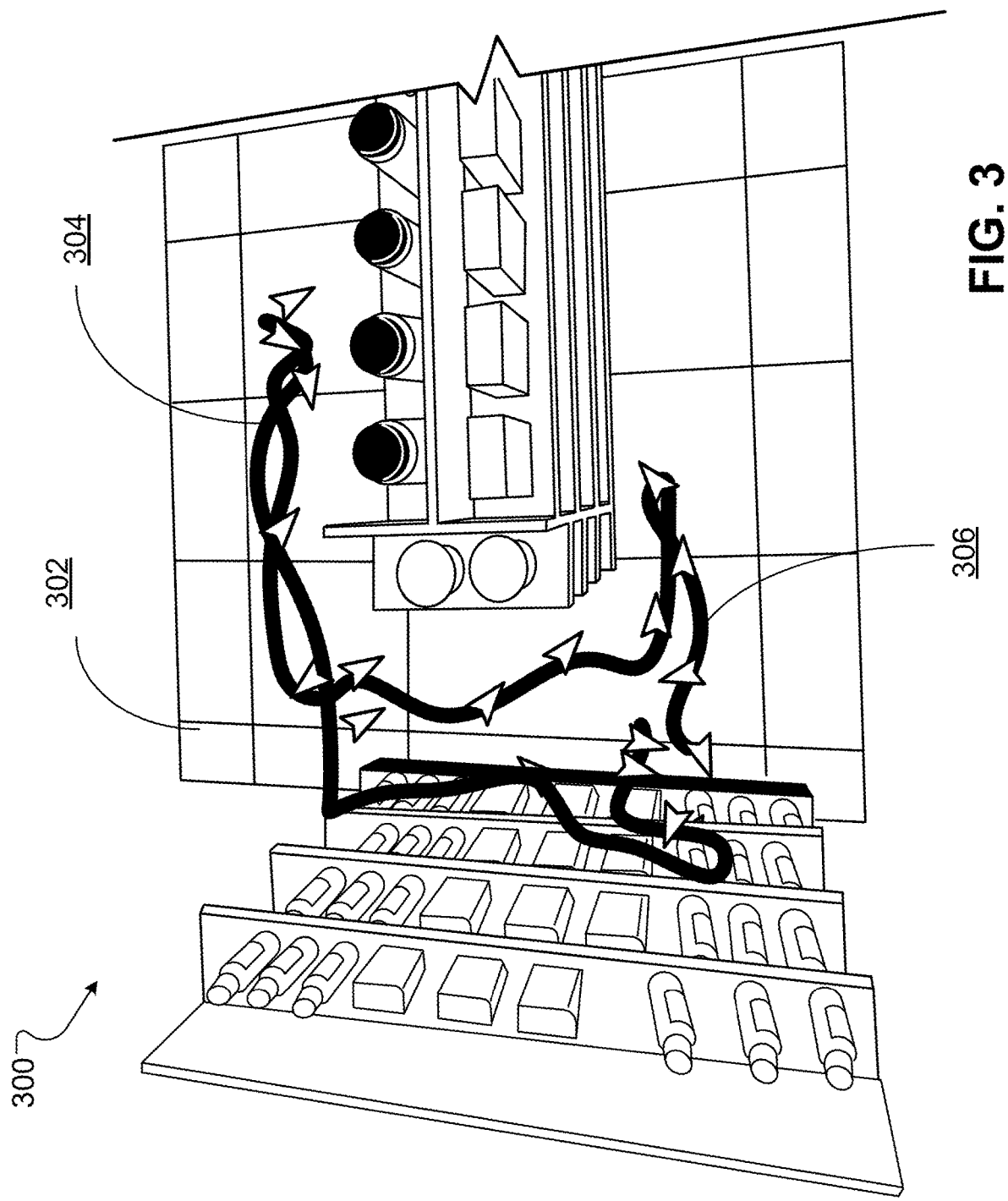
FIG. 3 illustrates example tracked user behavior during a process for deriving modifications to a virtual reality system.

FIG. 3 shows an example illustration 300 of tracked user behavior during a process for deriving modifications to a virtual reality system, e.g., process 200 described above with reference to FIG. 2. The example illustration 300 shows logged actions of a user as the user walks through a VR store environment 302. In this example illustration, the path 304 traveled by the user has been logged, as well as the direction 306 in which the user was looking at various intervals of time. Such user actions may be used to derive modifications to the VR environment 304, as described in more detail above with reference to FIG. 2.

Figure 4A:
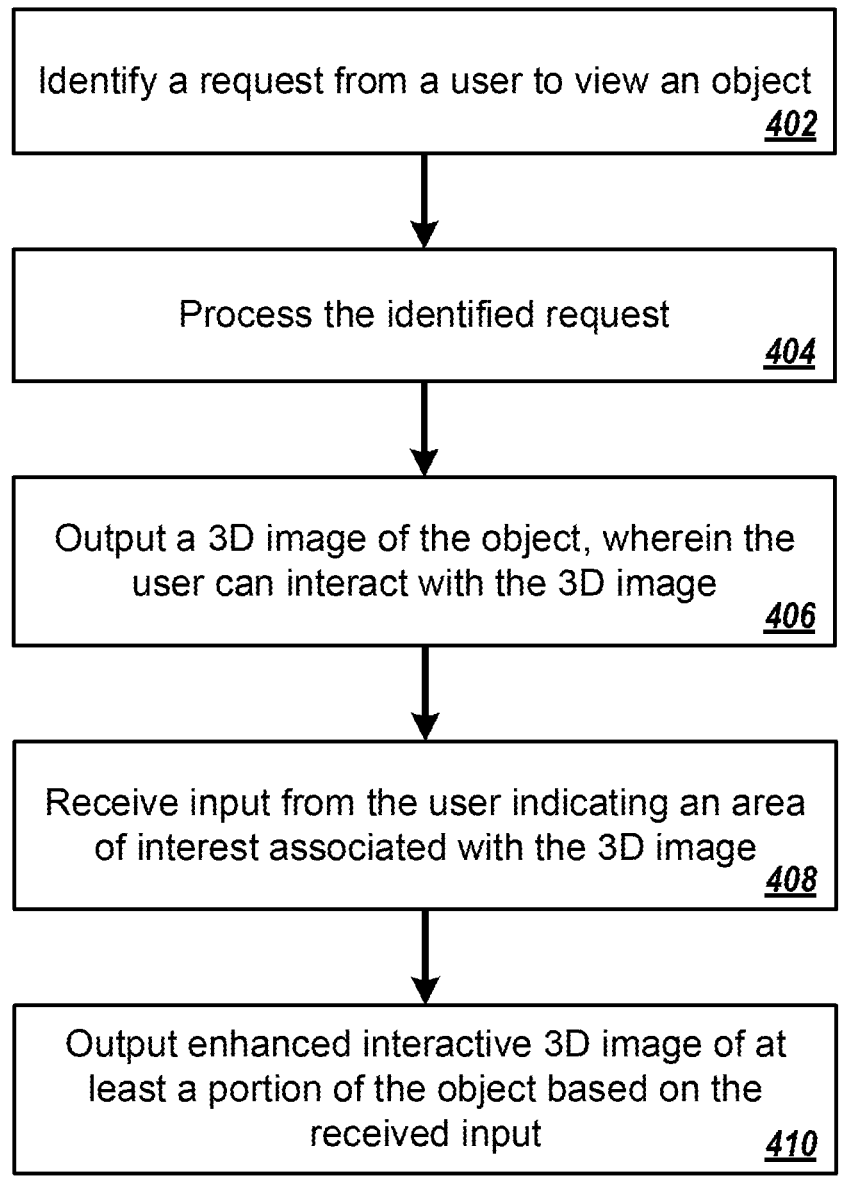
FIGS. 4A and 4B are flowcharts of example processes for exploring digital files using artificial intelligence.

FIG. 4A is a flowchart of an example process 400 for exploring digital files using artificial intelligence. For convenience, the process 400 will be described as being performed by a system including one or more computers located in one or more locations. For example, an analytics platform, e.g., the virtual reality analytics platform 100 of FIG. 1, appropriately programmed, can perform the process 400.

The system identifies, such as by a voice recognition system, a request from a user to view an object (step 402). In some implementations, the identified request from the user may include a verbal request to view an object. For example, the verbal request may include a verbal command or instruction, such as "show me the latest breaker box model."

The system processes, by an artificial intelligence model, the identified request (step 404). For example, the system may analyze the received request to determine properties of the request, e.g., the type of object the user wishes to view. In response to determining properties of the request, the system may identify a digital file representing the object. For example, the system may identify a digital file including data representing a 3D image of the object.

In some implementations, processing the identified request may further include determining a verbal response to the identified request. For example, the system may determine that an appropriate verbal response to the identified request is "I've placed the new breaker box model on your workbench."

The system outputs, by a virtual reality system and based on an identified digital file, a 3D image of the object (step 406). In some implementations, the output 3D image includes an interactive 3D image. For example, the system may output an interactive hologram representation of the object, e.g., a hologram of a breaker box. In some implementations the system may further output, by the virtual reality system, the determined verbal response to the identified request along with the 3D image of the object.

In some implementations, the system may further output, by the visualization system, a virtual image of an artificial intelligence assistant. For example, in some cases a virtual image of an artificial intelligence assistant may be automatically displayed when a user wears a VR headset or other device. In this example, requests from a user to view an object may be directed to the artificial intelligence assistant, as illustrated below with reference to illustration 502 of FIG.

5. As another example, a virtual image of an artificial intelligence assistant may be displayed in response to receiving a request from the user to view an object. The user can interact with the 3D image through the artificial intelligence assistant. An example artificial intelligence assistant is illustrated in FIG. 5 below.

The system receives an input from the user indicating an area of interest associated with the 3D image (step 408). In some implementations, the received input indicating an area of interest associated with the virtual 3D image may include verbal input. For example, the received input may include verbal instructions specifying an area of interest associated with the 3D image, e.g., "break the breaker box apart so I can see the components" or "show me all the switches in the breaker box."

Alternatively or in addition, the received input indicating an area of interest associated with the virtual 3D image may include gesture input. The gesture input may include data indicating one or more of (i) a user gaze direction, e.g., determined using an eye tracking subsystem included in the virtual reality system, or (ii) a hand gesture, e.g., determined using one or more body motion sensors. For example, the received input may include data indicating that the user looked at a certain part of the 3D image for a significant amount of time, e.g., a particular switch. As another example, the received input may include data indicating that the user performed a predetermined hand gesture, e.g., raising of the arm in the direction of an area of interest and touching the thumb with the forefinger. In some implementations both verbal input and gesture inputs may be used, e.g., the user may say "show me this switch" as they gaze in the direction of the displayed switch and touch their thumb with their forefinger.

The system outputs, by a virtual reality system, an enhanced interactive 3D image of at least a portion of the object based on the received input (step 410). For example, the system may output an image of the indicated area of interest, e.g., a 3D image of a particular switch.

In some implementations outputting an enhanced interactive 3D image may include outputting a 3D simulation of a process that may be performed by the object. For example, the system may identify a request from the user to view a particular simulation involving the object, e.g., "can you simulate how this switch works?" In response to the identified request, the system may output an interactive 3D simulation involving the object, e.g., showing current flowing through the switch. An example illustration showing an output 3D simulation is shown below with reference to FIG. 5.

Figure 4B:
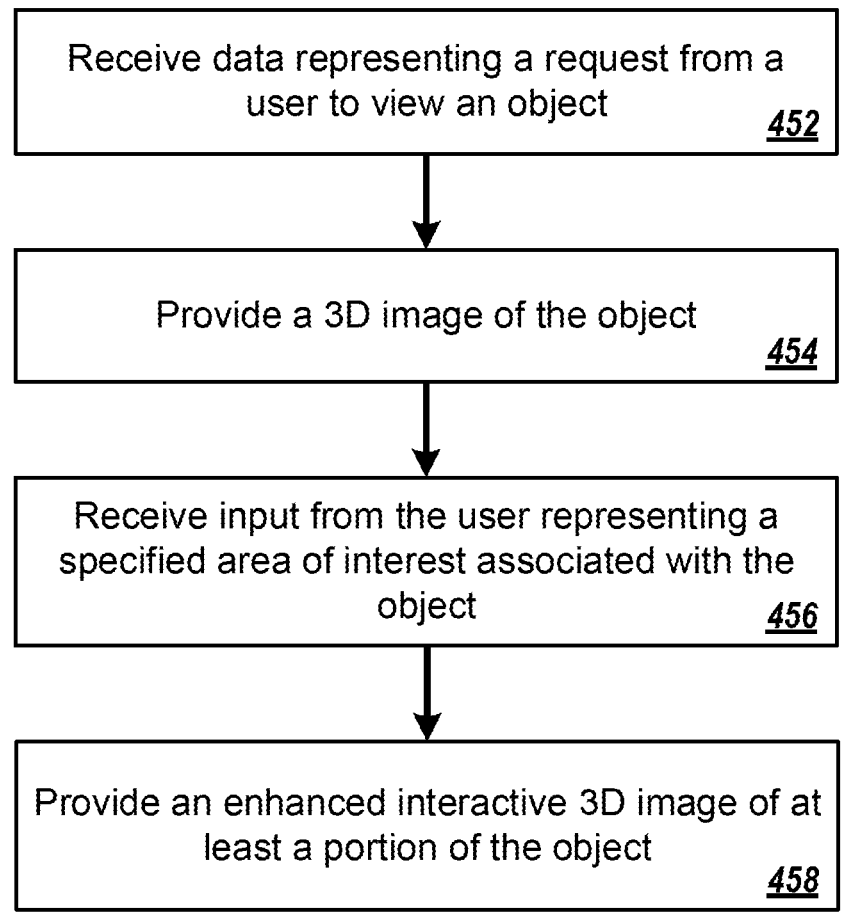
Figure 5A:
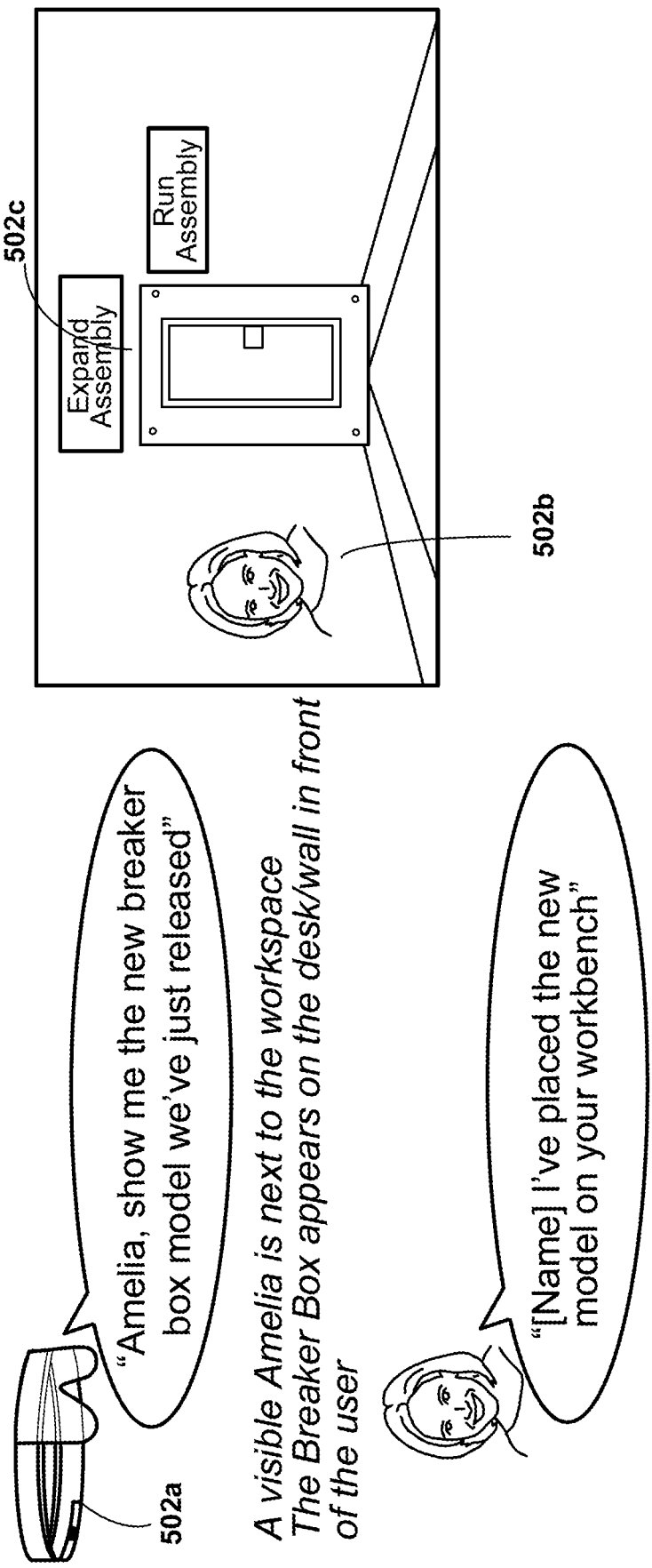
FIGS. 5A, 5B, 5C and 5D illustrate example stages of an example process for exploring digital files using artificial intelligence.
Figure 5B:
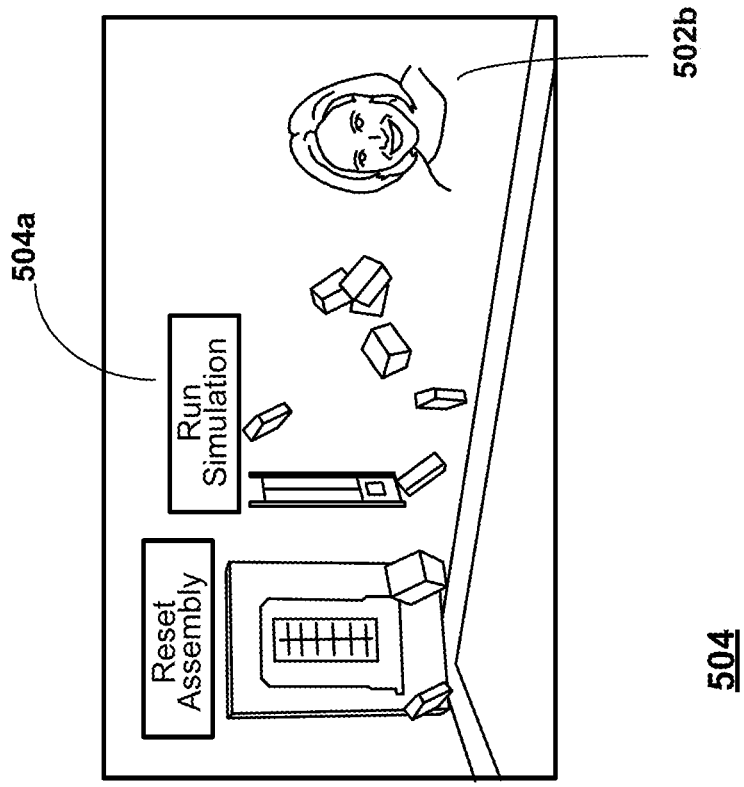
Figure 5B:
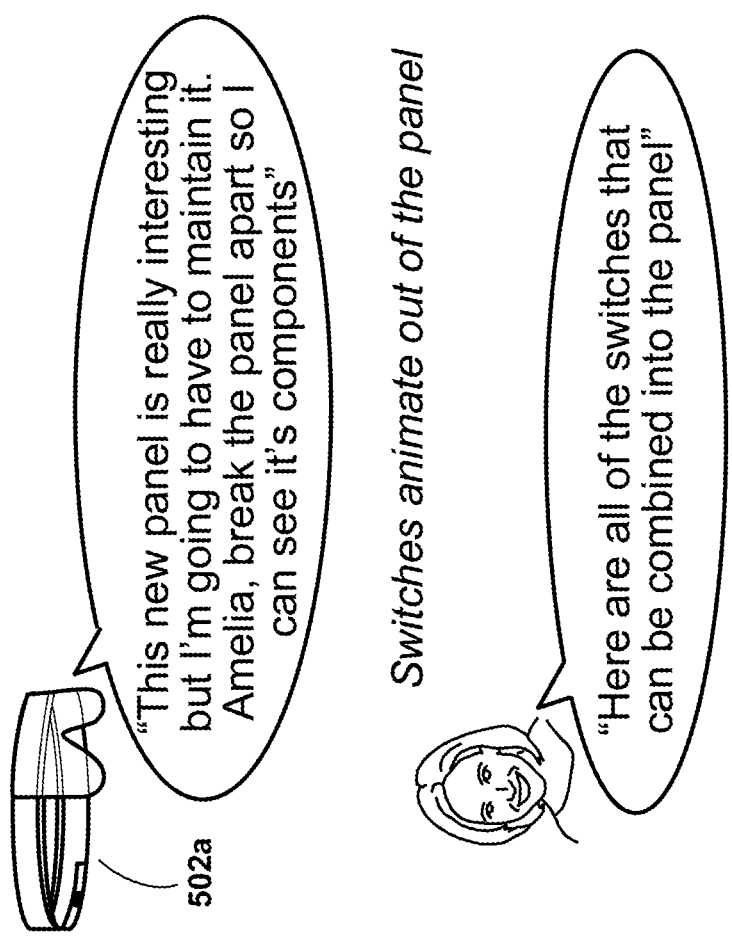
Figure 5C:
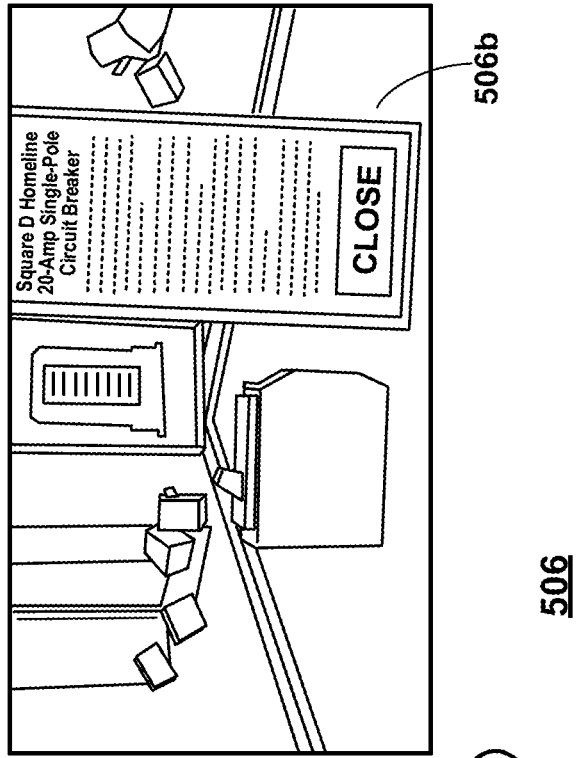
Figure 5C:
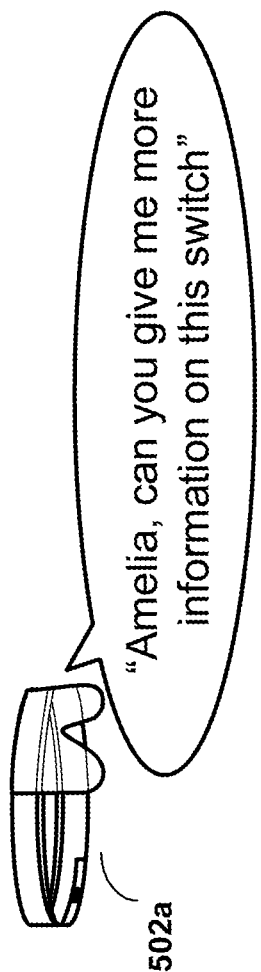
Figure 5C:
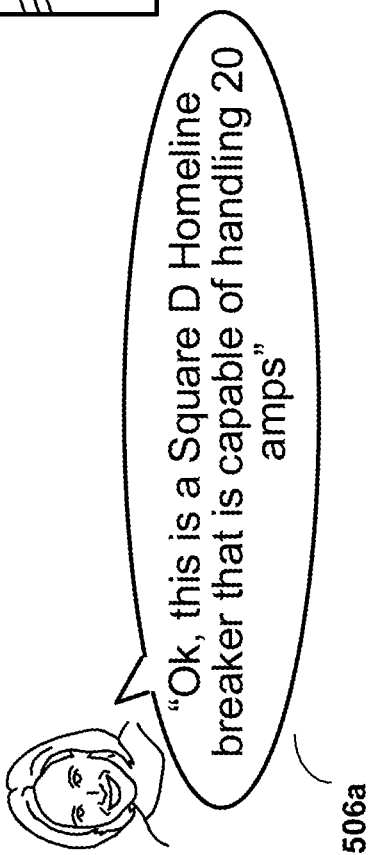
Figure 5D:
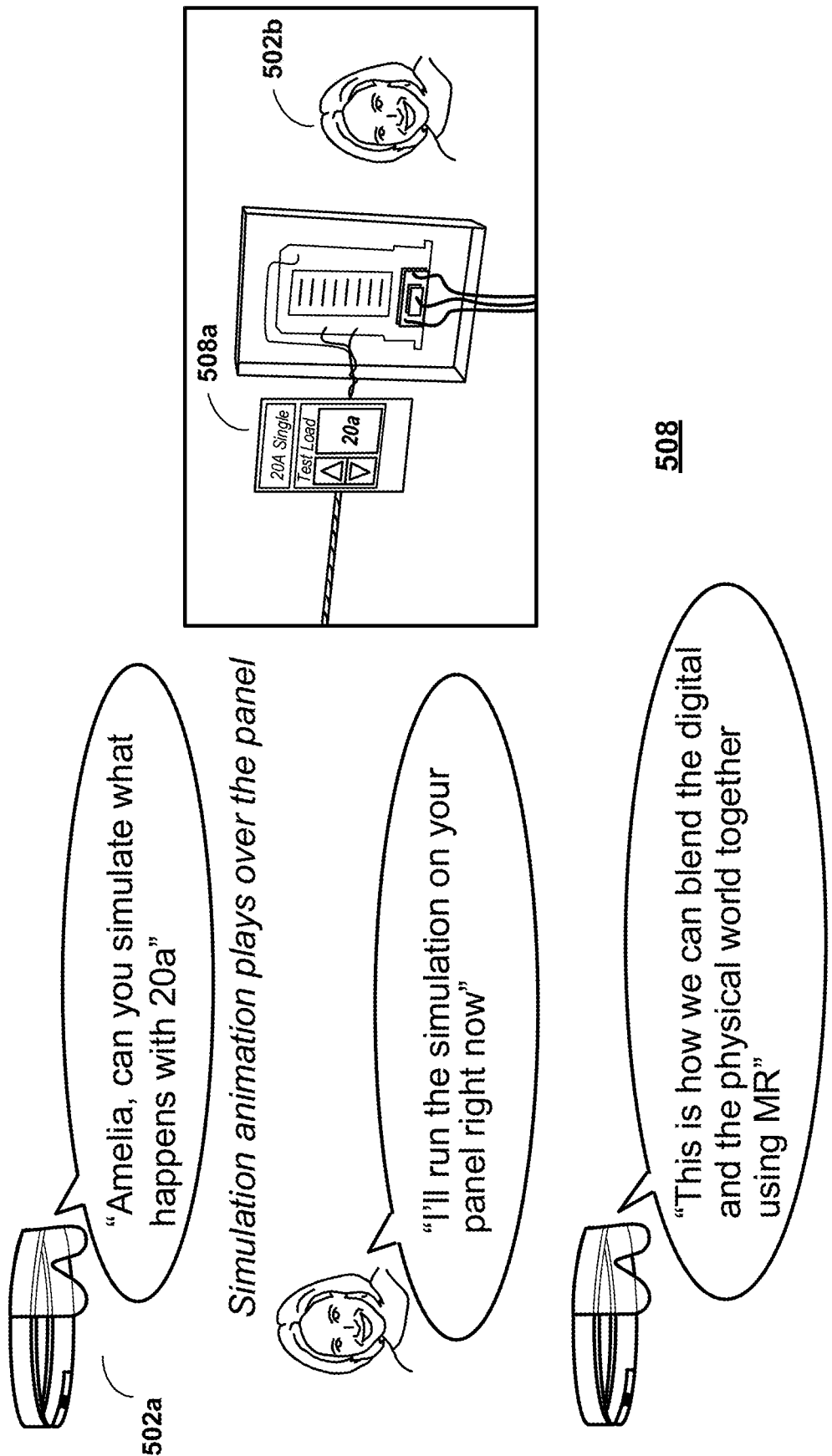

FIG. 4B is a flowchart of an example process 450 for exploring digital files using artificial intelligence. For convenience, the process 400 will be described as being performed by a system including one or more computers located in one or more locations. For example, a virtual reality display or device, e.g., the virtual reality headset 102 of FIG. 1, appropriately programmed, can perform the process 450.

The system receives, at an artificial intelligence engine connected to the virtual reality display, data representing a request from a user to view an object (step 452). The system provides, via the virtual reality display, a 3D image of the object (step 454). The system receives, at the artificial intelligence engine, input from the user representing a specified area of interest associated with the object (step 456). The system provides, from the artificial intelligence engine, an enhanced interactive 3D image of at least a portion of the object (step 458).

FIGS. 5A, 5B, 5C and 5D illustrate example stages 502-508 of an example process for exploring digital files using artificial intelligence, e.g., processes 400 and 450 described above with reference to FIGS. 4A and 4B, respectively.

During stage 502 (FIG. 5A), a wearer of a virtual reality headset 502a asks a visible artificial intelligence assistant 502b to show them an image of a particular breaker box. In response, an image of the breaker box 502c is displayed.

During stage 504 (FIG. 5B), the wearer of the virtual reality headset 502a asks the visible artificial intelligence assistant 502b to show them an image of the components of the breaker box. In response, an image 504a showing various components of the breaker box 502c is displayed.

During stage 506 (FIG. 5C), the wearer of the virtual reality headset 502a asks the artificial intelligence assistant to provide more information relating to a particular component of the breaker box 502c. In response, the artificial intelligence assistant audibly describes properties of the particular component 506a and displays an image 506b detailing information relating to the particular component.

During stage 508 (FIG. 5D), the wearer of the virtual reality headset 502a asks the visible artificial intelligence assistant 502b to simulate how a component of the breaker box functions. In response, a simulation 508a showing current flowing through the component of the breaker box is displayed.

Figure 6:
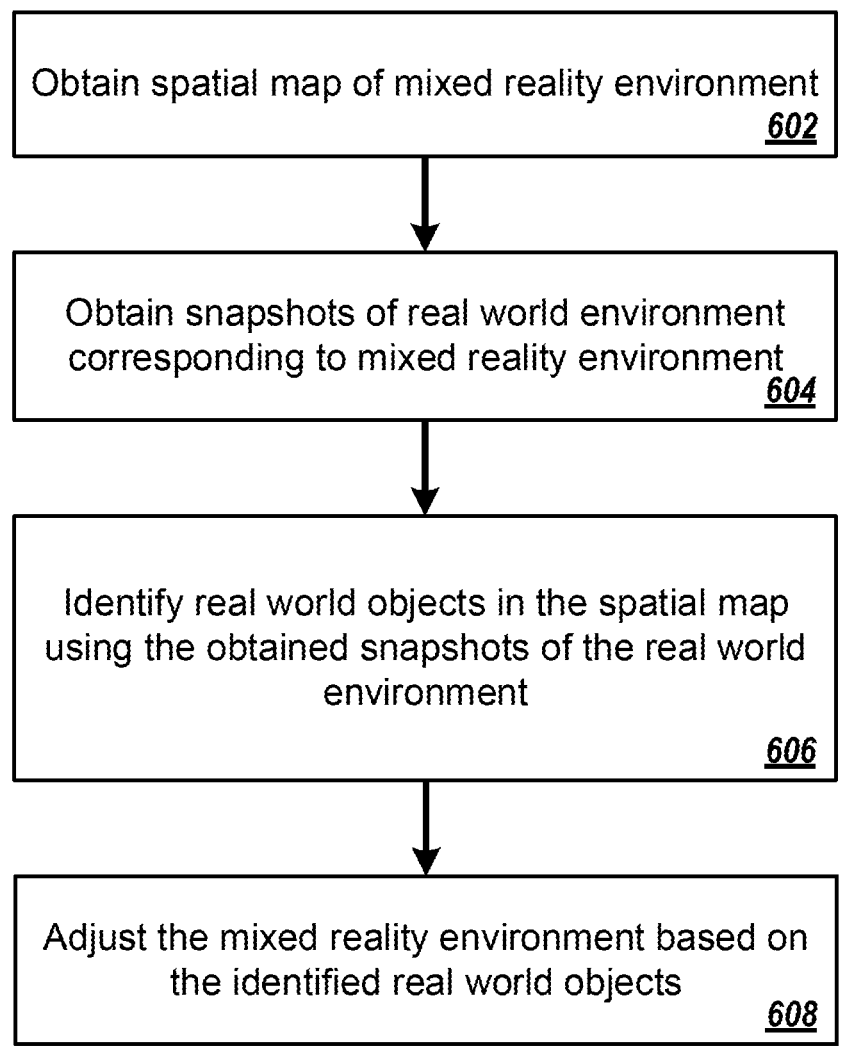
FIG. 6 is a flowchart of an example process for performing image discovery and analytics.

FIG. 6 is a flowchart of an example process 600 for performing image discovery and analytics. For convenience, the process 600 will be described as being performed by a system including one or more computers located in one or more locations. For example, an analytics platform, e.g., the virtual reality analytics platform 100 of FIG. 1, appropriately programmed, can perform the process 600.

The system obtains a spatial map of a mixed reality (MR) environment (step 602). The spatial map may include digital information, e.g., spatial mapping data, that defines objects in and properties of a MR environment. For example, in cases where the MR environment comprises a warehouse or factory, the spatial mapping data may define objects and/or surfaces within the MR environment, e.g., walls, shelves or items of machinery.

The system obtains snapshots of a real world environment corresponding to the MR environment (step 604). In some implementations the system may obtain snapshots of the real world environment by dynamically obtaining snapshots of the real world environment at regular intervals of time, e.g., every three seconds. For example, a viewer of the MR environment may wear a VR headset or other device that includes a camera that is configured to obtain photographic images of the real world environment corresponding to the MR environment. The obtained photographic images therefore correspond to the viewer's changing field of view. Continuing the example above, a viewer of the MR environment may be located in a warehouse or factory. In this example, the system may obtain photographic images of the warehouse or factory at regular intervals of time as the viewer moves around the warehouse or factory.

The system identifies real world objects in the spatial map using the obtained snapshots of the real world environment (step 606). In some implementations the system identifies real world objects in the spatial map by applying image recognition techniques to the obtained snapshots. For example, for a collection of one or more obtained snapshots, the system may identify multiple candidate real world objects in the real world environment. The system may then assign a confidence score to each of the multiple candidate identified real world objects, each confidence score representing a likelihood that the candidate real world object has been correctly identified. The system may then select a predetermined number of highest scoring real world objects as the identified real world objects, and link the identified real world objects to the spatial map. Linking the identified real world objects to the spatial map may include labelling locations or surfaces in the spatial map as corresponding to the identified real world objects. Continuing the example above, the system may identify real world objects such as different types of machinery in the warehouse or factory. The system may then link the real world objects to corresponding locations in the spatial map.

The system adjusts the MR environment based on the identified real world objects (step 608). In some implementations the system may adjust the MR environment based on the identified real world objects by ensuring that correct digital information in the spatial map is overlaying the correct physical objects in the real world environment. For example, if a real world object that is linked to the spatial map has been moved from an original location and a similar real world object is now in its place, the system may not automatically identify that the real world object is a different real world object. The system may therefore use the real world objects identified using image recognition technology to identifying whether incorrect digital information is overlaying one or more real world objects, and in response to identifying that incorrect digital information is overlaying one or more real world object, correcting the digital information.

In this manner, the system is provided with a layer of intelligence that improves the MR environment. Continuing the example above, a MR viewer may use the MR environment to identify machinery and view corresponding machinery schematics. In a factory or warehouse environment, where physical objects such as items of machinery are often moving, the digital map can be regularly updated such that the MR viewer is provided with an accurate MR environment.

In some implementations the system may further adjust the MR environment based on MR viewer input. For example, a MR viewer may specify one or more viewer preferences or settings. The system may then adjust the MR environment based on the identified real world objects and the MR viewer preferences or settings. In some cases MR viewer input may further include validating identified real world objects.

In some implementations the system may adjust the MR environment using crowd guided assistance. For example, the system may be configured to share requests, technical specifications, or images relating the MR environment with crowd experts using a crowd assistance platform. The crowd experts may respond to received requests in real time.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer implemented method comprising:
    logging user actions in a virtual reality (VR) system, wherein the user actions comprise (i) a path traveled by a user in the VR system, and (ii) user interactions with objects in the VR system and wherein the VR system is an immersive VR system that relies on polygonal models and utilizes a headset that immerses the user in a VR environment, the headset having sensors configured to determine which direction the user's head is facing, and wherein logging user interactions comprises monitoring whether a user looks at an object at least in part based on a direction the user's head is facing;
    aggregating logged user actions over a first user and a second user;
    deriving modifications to the VR system based at least in part on the aggregated logged user actions, the modifications to the VR system comprising modifying an appearance of objects shown in the VR system, wherein modifying an appearance of objects shown in the VR system comprises rendering objects with a low number of user interactions at a lower visual fidelity than objects with a high number of user interactions, and wherein deriving modifications to the VR system based at least in part on the aggregated logged actions comprises applying crowd-guided assistance provided by a crowd assistance platform configured to allow a worker to share a request to a plurality of distributed experts and to allow an expert from the plurality of distributed experts to respond;
    receiving data representing a request from the user to view an object of interest;
    providing, via the virtual reality system, a 3D image of the object of interest;
    receiving input from the user representing a specified area of interest associated with the object of interest; and
    providing an enhanced interactive 3D image of at least a portion of the object of interest based on the received input.

2. The method of claim 1, wherein logging user actions in the VR system comprises logging user actions using one or more sensors.

3. The method of claim 2, wherein the sensors include one or more of internet of things (IOT) sensors, VR sensors, and mixed reality (MR) sensors.

4. The method of claim 1, wherein logging user interactions comprises monitoring how a user looks at an object.

5. The method of claim 4, wherein monitoring how a user looks at an object comprises monitoring a user's gaze direction.

6. The method of claim 1, wherein user interactions comprise touching an object in the VR system.

7. The method of claim 1, wherein rendering objects with a low number of user interactions at a lower visual fidelity comprises rendering objects at a lower resolution.

8. The method of claim 1, wherein rendering objects with a low number of user interactions at a lower visual fidelity comprises rendering objects in two dimensions.

9. The method of claim 1, wherein modifying an appearance of objects shown in the VR system comprises similarly rendering objects with a low number of user interactions.

10. A system comprising:

one or more computers and one or more storage devices on which are stored instructions that are operable, when executed by the one or more computers, to cause the one or more computers to perform operations comprising:

logging user actions in a virtual reality (VR) system, wherein the user actions comprise (i) a path traveled by user in the VR system, and (ii) user interactions with objects in the VR system and wherein the VR system is an immersive VR system that relies on polygonal models and utilizes a headset that immerses the user in a VR environment, the headset having sensors configured to determine which direction the user's head is facing, and wherein logging user interactions comprises monitoring whether a user looks at an object at least in part based on a direction the user's head is facing;

aggregating logged action over a first user and a second user; and deriving modifications to the VR system based at least in part on the aggregated logged actions, the modifications to the VR system comprising modifying an appearance of objects shown in the VR system, wherein modifying an appearance of objects shown in the VR system comprises rendering objects with a low number of user interactions at a lower visual fidelity than objects with a high number of user interactions, and wherein deriving modifications to the VR system based at least in part on the aggregated logged actions comprises applying crowd-guided assistance provided by a crowd assistance platform configured to allow a worker to share a request to a plurality of distributed experts and to allow an expert from the plurality of distributed experts to respond;

receiving data representing a request from the user to view an object of interest;

providing, via the virtual reality system, a 3D image of the object of interest;

receiving input from the user representing a specified area of interest associated with the object of interest; and providing an enhanced interactive 3D image of at least a portion of the object of interest based on the received input.

11. The system of claim 10, wherein rendering objects with a low number of user interactions at a lower visual fidelity comprises rendering objects at a lower resolution.

12. The system of claim 10, wherein rendering objects with a low number of user interactions at a lower visual fidelity comprises rendering objects in two dimensions.

13. The system of claim 10, wherein modifying an appearance of objects shown in the VR system comprises similarly rendering objects with a low number of user interactions.

14. The system of claim 10, wherein logging user interactions comprises monitoring how a user looking at an object, determined by an angle and direction a user's head is facing.

15. The system of claim 14, wherein monitoring how a user looks at an object comprises monitoring a user's gaze direction.

16. The system of claim 10, wherein user interactions comprise touching an object in the VR system.

17. The system of claim 10, wherein logging user actions in the VR system comprises logging user actions using one or more sensors.

18. The system of system 17, wherein the sensors comprises internet of things (TOT) sensors.

19. The system of claim 10, wherein user interactions comprise touching an object in the VR system.

* * * * *

UNITED STATES PATENT AND TRADEMARK OFFICE
CERTIFICATE OF CORRECTION

PATENT NO. : 10,712,814 B2
APPLICATION NO. : 15/956816
DATED : July 14, 2020
INVENTOR(S) : Sunny Webb et al.

Page 1 of 1

It is certified that error appears in the above-identified patent and that said Letters Patent is hereby corrected as shown below:

In the Claims

In Claim 18, Column 18, Line 31, delete "system 17," and insert -- claim 17, --, therefor.

In Claim 18, Column 18, Line 32, delete "(TOT)" and insert -- (IOT) --, therefor.

Signed and Sealed this
Fifteenth Day of September, 2020

Andrei Iancu
*Director of the United States Patent and Trademark Office*